Figure 1:
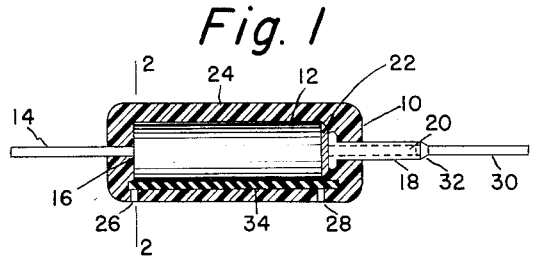

Feb. 10, 1953  H. E. BRAFMAN  2,628,271
MOLDED ELECTROLYTIC CAPACITOR
Filed July 11, 1950

INVENTOR.
HAROLD E. BRAFMAN
BY
HIS ATTORNEY

Patented Feb. 10, 1953

2,628,271

UNITED STATES PATENT OFFICE 2,628,271

MOLDED ELECTROLYTIC CAPACITOR

Harold E. Brafman, North Adams, Mass., assignor to Sprague Electric Company, North Adams, Mass., a corporation of Massachusetts Application July 11, 1950, Serial No. 173,111

6 Claims. (Cl. 175—315)

The present invention relates to electrolytic capacitors and in particular to electrolytic capacitors having molded casings.

Electrolytic capacitors normally include electrolyte compositions which during use, particularly under high field strengths, may produce gases such as hydrogen, low molecular weight hydrocarbons and the like. Since it is necessary that electrolytic capacitors be more or less sealed in order that they be stable under various operating conditions, there is the ever present danger that the evolved gases will build up a pressure within the sealed unit sufficient to burst the capacitor housing. In this event there is danger that fragments of the housing will cause considerable damage. Because of this and for other reasons of safety, electrical underwriters require the provision of venting means for all electrolytic capacitors operating at high field strengths.

The provision of a venting means to meet underwriter requirements increases production problems and results in higher costs for the capacitor. Various venting means are employed on metal "can" type electrolytic capacitors; however, each of these means involve special and separate production operations and apparatus that are both time consuming and expensive.

It is an object of the present invention to overcome the foregoing and related disadvantages. It is another object to produce a low cost molded electrolytic capacitor. It is a further object to produce a vented molded tubular electrolytic capacitor that will meet electrical underwriters' standards. These and other objects of the invention will become apparent from the description and claims that follow.

These objects are attained in accordance with the present invention wherein there is produced a vented molded tubular electrolytic capacitor comprising a convolutely wound electrolytic capacitor section, an electrically conducting terminal lead connected to one electrode of said section, and an electrically conducting eyelet connected to the other electrode of said section and having an opening therein for the impregnation of the section with electrolyte, a molded thermosetting resin casing enclosing said section but leaving the eyelet opening exposed, at least one electrolyte-impervious yieldable barrier in said casing providing for the safe escape of gas from said capacitor, the interior of said capacitor being impregnated with electrolyte and said opening in said eyelet being sealed, and an electrically conducting terminal lead being conductively connected to said eyelet. The impervious yieldable barrier is preferably an elastomer such as rubber. The invention may take several forms, for instance the casing may have cavities or openings filled with the elastomer or a strip of the elastomer may be placed between the capacitor section and the casing so as to block openings in the casing and form a seal between the casing and the capacitor section. Under certain circumstances the elastomer may be in the form of a washer or an end cap sealing the casing to a terminal lead of the capacitor. It is further contemplated that the entire capacitor section, except for the eyelet opening, may be encased in a sheath of the elastomer compound. In order to make the latter capacitor more rigid and stable an outer molded resin casing having cavities therein, and as previously described, may enclose the elastomer encased section.

Figure 2:
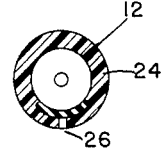
Figure 3:
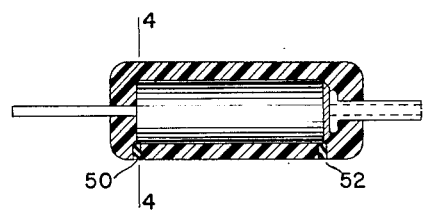
Figure 4:
Figure 5:
Figures 6, 7:
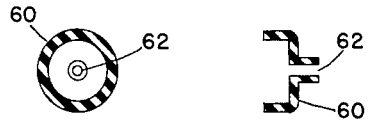
Figure 8:
Figures 9, 10:

The invention will be more fully described with reference to the appended drawings wherein:

Figures 1, 3, 5 and 8 show in partial cross-section several capacitors produced in accordance with various embodiments of the present invention, Figure 2 is a view taken along the section 2—2 of Figure 1, Figure 4 is a view taken along the section 4—4 of Figure 3, Figure 6 is an end view of the elastomer cap shown in Figure 5, Figure 7 is a side cross-section view of the cap shown in Figure 5, Figure 9 is an end view of the elastomer washer shown in Figure 8, and Figure 10 is a side view of the washer shown in Figure 8.

Referring specifically to Figures 1 and 2, there is shown a vented molded tubular electrolytic capacitor 10 comprising a convolutely wound electrolytic capacitor section 12, an electrically conducting tinned terminal lead 14 connected to one electrode of section 12 by means of solder 16, and an electrically conducting eyelet 18 having an opening 20 therein for the impregnation of electrolyte (not shown) into section 12 connected to the other electrode of section 12 by means of solder 22, a molded thermosetting phenol-formaldehyde resin casing or the like, 24 enclosing section 12 except for opening 20 in eyelet 18, openings 26, 28 in the casing 24, and an elastomer strip of rubber or a suitable silicone plastic resin 34 (by silicone it is meant an organo-substituted polysiloxane in which the organo groups are bonded by carbon-to-silicon bonds) engaged between section 12 and casing 24 sealing the openings 26, 28. After impregnation with electrolyte a tinned terminal lead 30 may be inserted in opening 20 of eyelet 18 and soldered thereto by means of solder 32 which also hermetically seals the capacitor 10.

The embodiment of the invention shown in Figures 3 and 4 is similar to that shown in Figures 1 and 2 except that the elastomer strip 34 is not employed, instead openings 26, 28 are filled with an elastomer plug such as 50, 52.

Figures 5, 6 and 7 show another variation of the present invention. Here there are neither strip 34 nor openings 26, 28. Instead capacitor section 12 is provided with an elastomer end cap 60 formed to fit securely over the end of section 10 and having an opening 62 therein through which terminal lead 14 may project.

The embodiment of the invention shown in Figures 8, 9 and 10 is similar to that shown in Figures 5, 6 and 7 except that end cap 62 is replaced by elastomer washer 70. The washer 70 is provided with an annular indentation 72 to securely engage it to capacitor casing 24.

When openings such as 26, 28 are employed to provide the capacitor with venting means, it is desirable that they be at least $\frac{1}{16}$" in width.

In the present invention an electrolytic capacitor section formed in accordance with known procedure such as disclosed in Burnham U. S. P. 2,444,725 issued August 9, 1944, is electrically terminated and encased in a thermosetting resin casing as disclosed in copending application Serial No. 718,962. Knockout pins are usually employed to aid in removing the finished casing from the mold. In accordance with the present invention the length of at least one of the knockout pins used may be extended above the bottom of the mold to form a cavity or opening in the resin casing. A strip of elastomer may be placed so as to be disposed between the extended knockout pin or pins, and the capacitor section so that perfect sealing between the elastomer, the section, and the casing is effected by the pressure exerted during the molding cycle. If the strip of elastomer is not employed to seal the casing cavities, other means such as have been previously described may be employed to do so. The so encased capacitor may then be impregnated through the eyelet with a suitable electrolyte such as described in the Burnham U. S. P. 2,444,725.

Pre-forms of partially molded phenol-formaldehyde resin may be used to facilitate the final molding of the capacitors. This is usually done by preparing similar top and bottom pre-forms approximately corresponding to the longitudinally split final casing. One pre-form may then be placed in the bottom of a suitable mold carrying knockout pins which penetrate the pre-form, a strip of elastomer placed over this pre-form, the unimpregnated capacitor section put in place, the section covered with the top pre-form and the upper section of a mold fitted over the entire combination. Heat and pressure are then applied for the required time after which the mold is opened and the semi-finished capacitor removed as by ejection with the knockout pins. The pre-forms may be made in any convenient shape and can be similarly used with any of the above-described variations. It is also feasible to make the knockout pin or pins of such a length as to leave a thin layer of resin between the capacitor section and the atmosphere. In this event the thin layer will harmlessly give way under the internal stress set up by gas evolution, before the entire casing is subject to any danger of explosion. The thin resin layer can be used either by itself or in combination with an elastomer wall as described above.

Although I have described in particular the use of a heat and pressure molded phenol-formaldehyde casing about the capacitor section, other suitable cast or pressure molded casings may be used. Barrier-exposing openings may be provided in either or both the top and bottom casing pre-forms when pre-forms are used in the molding operation. The capacitor of the invention can also have its casing applied by other molding methods not using pre-forms. Thermosetting casings are preferred over thermoplastic casings because of the improved rigidity; however, thermoplastic resins such as polyethylene, polystyrene, polyvinyl chloride are satisfactory for certain purposes such as condensers operating at relatively low temperatures.

As many apparently widely different embodiments of this invention may be made without departing from the spirit and scope hereof, it is to be understood that the invention is not limited to the specific embodiments hereof except as defined in the appended claims.

What is claimed is:

1. A vented molded tubular electrolytic capacitor consisting essentially of a convolutely wound electrolytic capacitor section, an electrically conducting terminal lead connected to one electrode of said section, and an electrically conducting eyelet connected to the other electrode of said section and having an opening therein for the impregnation of electrolyte, a molded thermosetting resin casing enclosing said section but leaving the eyelet opening exposed, at least one electrolyte-impervious yieldable gas discharge barrier in said casing and in contact with the section to provide for the safe escape of gas from said capacitor, the interior of said capacitor being impregnated with electrolyte said opening in said eyelet being sealed, and an electrically conducting terminal lead being conductively connected to said eyelet.

2. The vented molded tubular electrolytic capacitor defined in claim 1 wherein the electrolyte-impervious yieldable barrier consists of openings in said thermosetting resin casing which are sealed by an elastomer compound.

3. The vented molded tubular electrolytic capacitor defined in claim 2 wherein said elastomer is in the form of a strip of solid material engaged between said capacitor section and said casing covering and sealing said openings.

4. The vented molded tubular electrolytic capacitor defined in claim 1 wherein the electrolyte-impervious yieldable barrier is in the form of an annular opening about the terminal lead at one end of said capacitor sealed by a washer composed of an elastomer compound.

5. The molded tubular electrolytic capacitor defined in claim 1 wherein one end of said capacitor section is encased in an end cap of an elastomer material having an opening therein through which said terminal lead projects, an end of said end cap projecting through said molded casing.

6. In a vented unitary molded tubular electrolytic capacitor: a convolutely wound electrolytic capacitor section, an electrically conducting terminal lead connected to one electrode of said section, an electrically conducting eyelet connected to the other electrode of said section and having an opening therein for the impregnation of electrolyte, a molded thermosetting resin casing enclosing said section but leaving the eyelet opening exposed, and at least one electrolyte-impervious yieldable gas discharge barrier in said casing and in contact with the capacitor section to provide for the safe escape of gas from said capacitor.

HAROLD E. BRAFMAN.

REFERENCES CITED

The following references are of record in the file of this patent:

UNITED STATES PATENTS

| Number | Name | Date |
|---|---|---|
| 2,144,959 | Blackburn | Jan. 24, 1939 |
| 2,184,686 | Deutschmann | Dec. 26, 1939 |
| 2,270,740 | Robinson | Jan. 20, 1942 |
| 2,282,459 | Deeley | May 12, 1942 |
| 2,355,788 | Dunleavey | Aug. 15, 1944 |
| 2,535,945 | Menschik | Dec. 26, 1950 |